United States Patent
Schacht et al.

(10) Patent No.: US 6,959,437 B2
(45) Date of Patent: Oct. 25, 2005

(54) SYSTEM AND METHOD FOR INSTALLING PRINTER DRIVER SOFTWARE

(75) Inventors: Bryan Schacht, Laguna Beach, CA (US); Amarender Reddy, Fountain Valley, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 598 days.

(21) Appl. No.: 09/949,136

(22) Filed: Sep. 7, 2001

(65) Prior Publication Data

US 2003/0051011 A1  Mar. 13, 2003

(51) Int. Cl.$^7$ .............................................. G06F 13/10
(52) U.S. Cl. ...................... 719/321; 719/327; 717/174; 717/176; 717/177; 717/178
(58) Field of Search ............................... 719/321, 327; 717/174, 176, 177, 178

(56) References Cited

U.S. PATENT DOCUMENTS

| | | | | |
|---|---|---|---|---|
| 5,327,526 | A | | 7/1994 | Nomura et al. .............. 395/115 |
| 5,580,177 | A | * | 12/1996 | Gase et al. .................... 400/61 |
| 5,862,404 | A | | 1/1999 | Onaga ......................... 395/828 |
| 6,184,996 | B1 | | 2/2001 | Gase ........................... 358/1.15 |
| 6,202,092 | B1 | | 3/2001 | Takimoto .................... 709/225 |
| 6,542,892 | B1 | * | 4/2003 | Cantwell ...................... 707/10 |
| 6,606,669 | B1 | * | 8/2003 | Nakagiri ...................... 719/327 |
| 6,607,314 | B1 | * | 8/2003 | McCannon et al. ........... 400/62 |
| 6,633,400 | B1 | * | 10/2003 | Sasaki et al. ............... 358/1.15 |
| 6,636,891 | B1 | * | 10/2003 | LeClair et al. ............. 358/1.15 |
| 6,671,063 | B1 | * | 12/2003 | Iida ........................... 358/1.15 |
| 6,681,392 | B1 | * | 1/2004 | Henry et al. ................. 717/176 |
| 6,782,495 | B2 | * | 8/2004 | Bernklau-Halvor .......... 714/44 |

FOREIGN PATENT DOCUMENTS

| | | | | |
|---|---|---|---|---|
| EP | 1109113 A2 | * | 6/2001 | ........... G06F 17/30 |
| JP | 07311663 A | | 11/1995 | |

* cited by examiner

Primary Examiner—Meng-Al T. An
Assistant Examiner—Andy Ho
(74) Attorney, Agent, or Firm—David C. Ripma; Joseph P. Curtin; David Cordeiro

(57) ABSTRACT

A system and method are provided for a network-connected printer to supply printer driver software to a network-connected computer workstation. The method comprises: receiving a request addressed to a first IP address from a network-connected computer workstation; supplying a web page from an embedded web server; in response to accessing the web server, causing printer driver software to be supplied to the computer workstation; receiving documents from the computer workstation in accordance with the supplied printer driver software; and, processing the received documents. The method further comprises: supplying updated printer driver software. Typically, the printer receives updated printer software in communications with an external server/web server. The printer automatically supplies updated printer driver software to the computer workstation, or supplies the updated software in response to prompts supplied to the computer workstation.

10 Claims, 4 Drawing Sheets

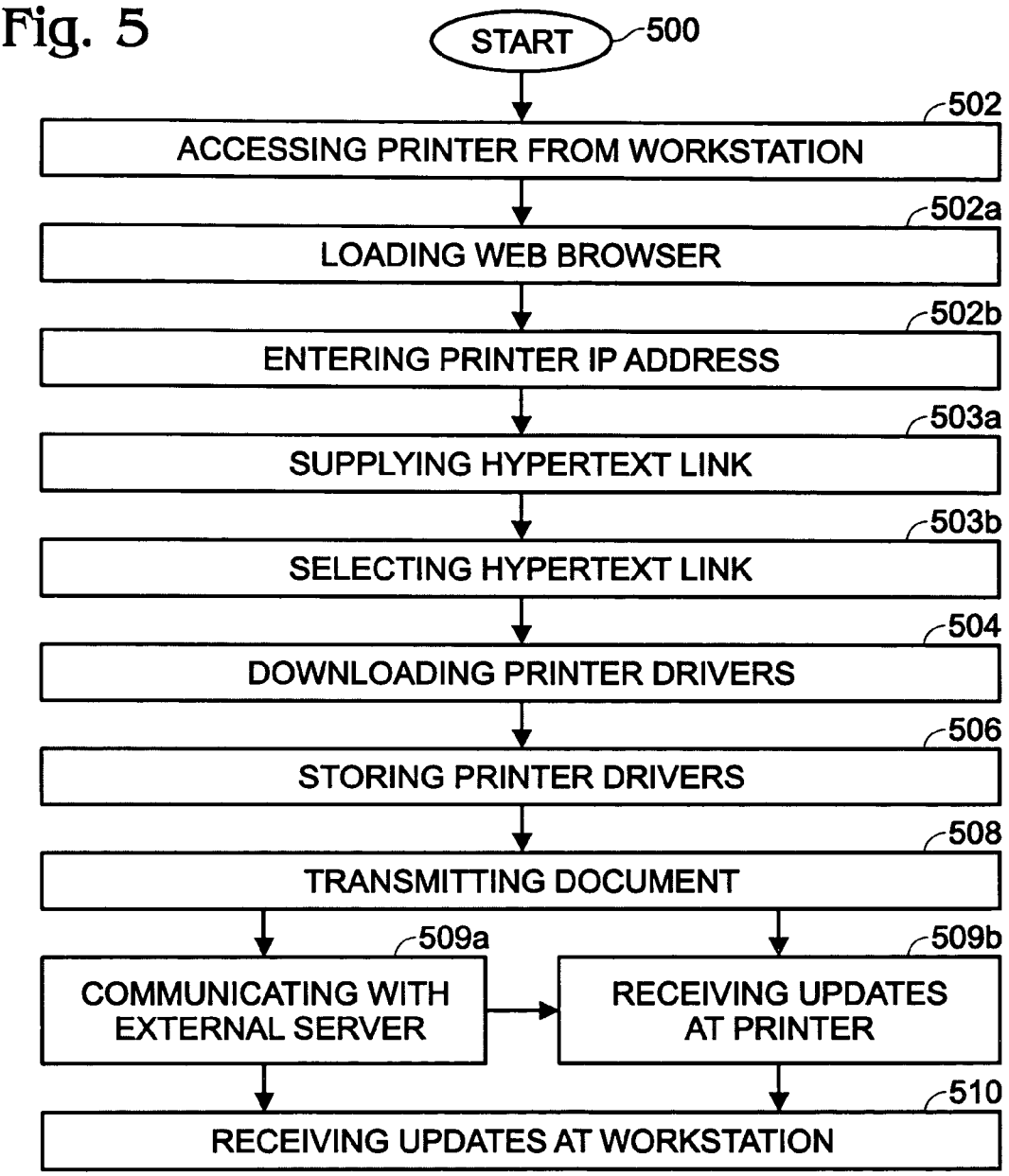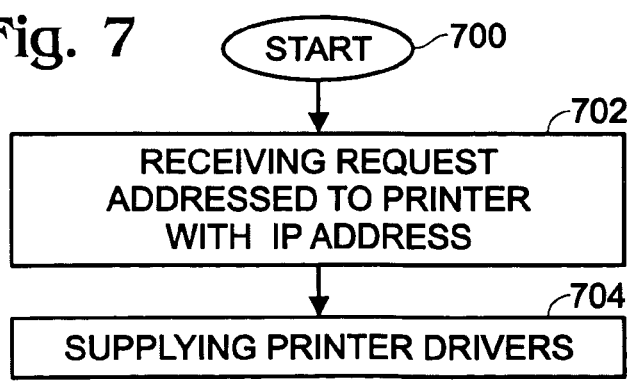

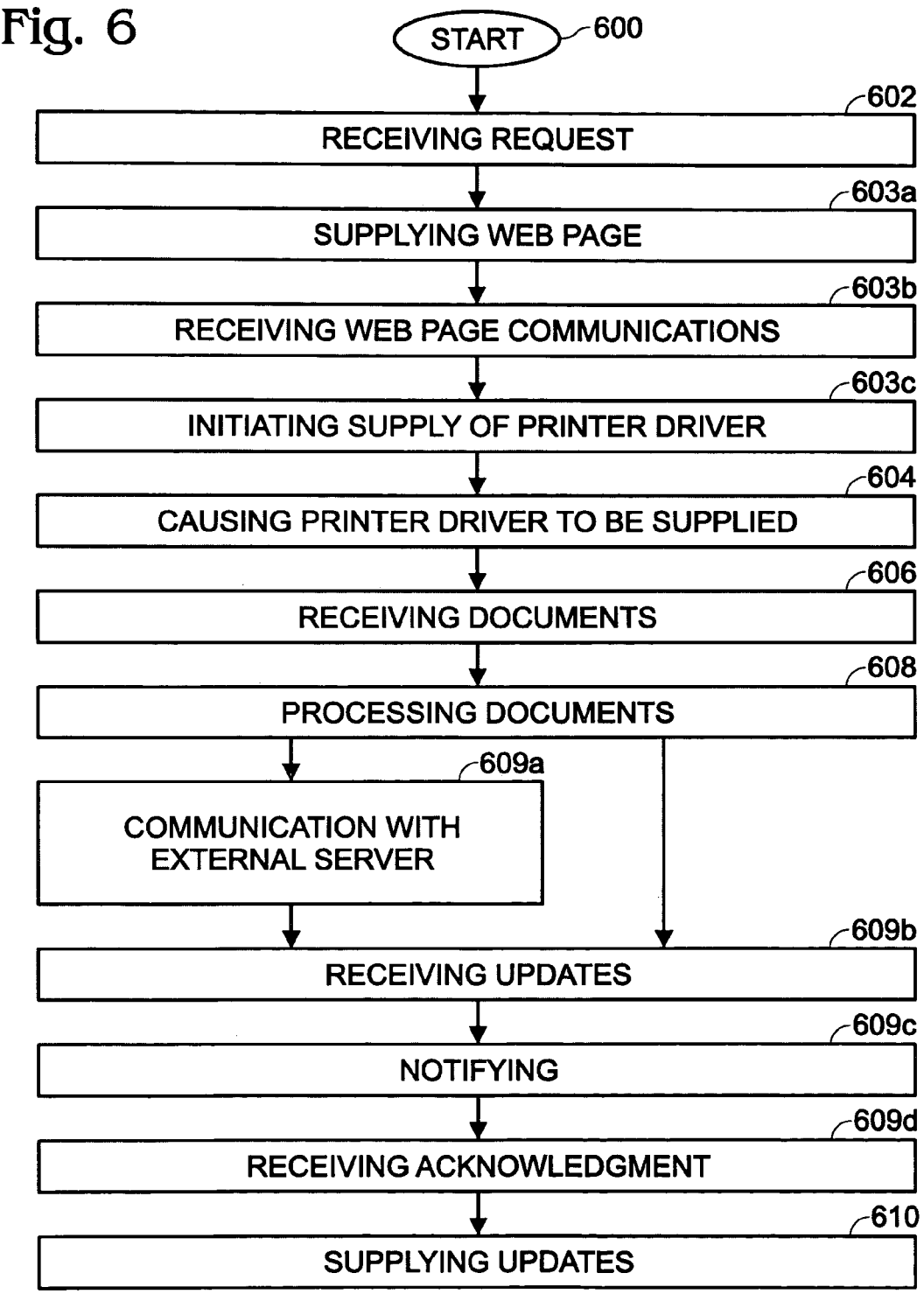

SYSTEM AND METHOD FOR INSTALLING PRINTER DRIVER SOFTWARE

BACKGROUND OF THE INVENTION

1. Field of the Invention

This invention generally relates to electronic printers, copiers, and multifunction peripherals (MFPs) and, more particularly, to a system and method for installing printer driver software on a computer workstation that is network-connected to a printer.

2. Description of the Related Art

Digital copiers continue to become more capable in the areas of printing, and document scanning. These multifunction services are often best used with personal computers running operating systems, such as Microsoft Windows or similar operating systems. To use the scanning and printing services of the copier, the user must first be aware of the copier installation, and secondly must load and configure certain drivers that access the copier features. The installation of drivers and server software is often a barrier to taking greater advantage of the printing features in the copier.

Conventionally, a multifunction printer, multifunction copier, or MFP, typically referred to herein as a printer, must first be installed on a network with the aid of an IP address, lightweight directory assistance protocol (LDAP) servers, network masks, etc. Secondly, a print queue must be established on a server using Windows NT, Netware, or the equivalent to provide print queuing services to the printer. This installation and setup of print queues is needed to provide intermediate storage of print jobs that are waiting to be printed. Also, it provides reporting status to users to show other jobs in the print queue, allowing users to adjust print priorities.

The installation of such a network-connected printer normally requires a skilled network technician, and the installation can become the gating item in getting a new printer working in an office environment. Also, the potential users of the printer need to know the complicated steps of finding the appropriate server and print queue, and then installing appropriate drivers on their system to access the print queue.

FIG. 1 is a schematic block diagram of a convention system for interfacing a computer workstation to a printer (prior art). Communications with the printer proceed through a network-connected printer server. Printer driver software can be installed on computer workstations using mediums such as floppy disks, CD-ROMs, from Internet web sites, or automatic installation from print servers or queue managers. However, all these methods still require relatively complicated network connection processes to engage the printer server and printer.

It would be advantageous if printer driver software could be easily loaded into computer workstations.

It would be advantageous if computer novices could install printer driver software without the need of computer network technicians.

It would be advantageous if printer driver software could be installed in a computer workstation merely by addressing a network-connected printer.

SUMMARY OF THE INVENTION

The present invention describes a simplified installation process that uses peer-to-peer networking to install printer driver software directly into a computer workstation, so that the above-mentioned software installation problems are avoided.

Accordingly, a method is provided for a network-connected printer to supply printer driver software to a network-connected computer workstation. The method comprises: receiving a request addressed to a first IP address from a network-connected computer workstation; supplying a web page from an embedded web server; in response to accessing the web server, causing printer driver software to be supplied to the computer workstation; receiving documents from the computer workstation in accordance with the supplied printer driver software; and, processing the received documents.

The method further comprises: supplying updated printer driver software. Typically, the printer receives updated printer software in communications with an external server/web server. The printer automatically supplies updated printer driver software to the computer workstation, or supplies the updated software in response to prompts supplied to the computer workstation.

Additional details of the above-described method, and a system for installing printer driver software in a network-connected computer workstation are provided below.

BRIEF DESCRIPTION OF THE DRAWINGS

FIG. 5 is a flowchart illustrating a method for installing printer driver software in the computer workstation, of a network including a printer and a computer workstation.

FIG. 6 is a flowchart illustrating a method for a network-connected printer to supply printer driver software to a network-connected computer workstation.

FIG. 7 is a flowchart illustrating a method for supplying printer driver software from a printer.

DETAILED DESCRIPTION OF THE PREFERRED EMBODIMENTS

Some portions of the detailed descriptions that follow are presented in terms of procedures, steps, logic blocks, codes, processing, and other symbolic representations of operations on data bits within a computer memory or processor. These descriptions and representations are the means used by those skilled in the data processing arts to most effectively convey the substance of their work to others skilled in the art. A procedure, computer executed step, application, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like. These physical devices can be considered to interact with logical processes or applications and, therefore, are "connected" to logical operations. For example, a memory can store or access code to further a logical operation, or an application can call a code section from memory for execution.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "connecting" or "translating" or "displaying" or "prompting" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 2:
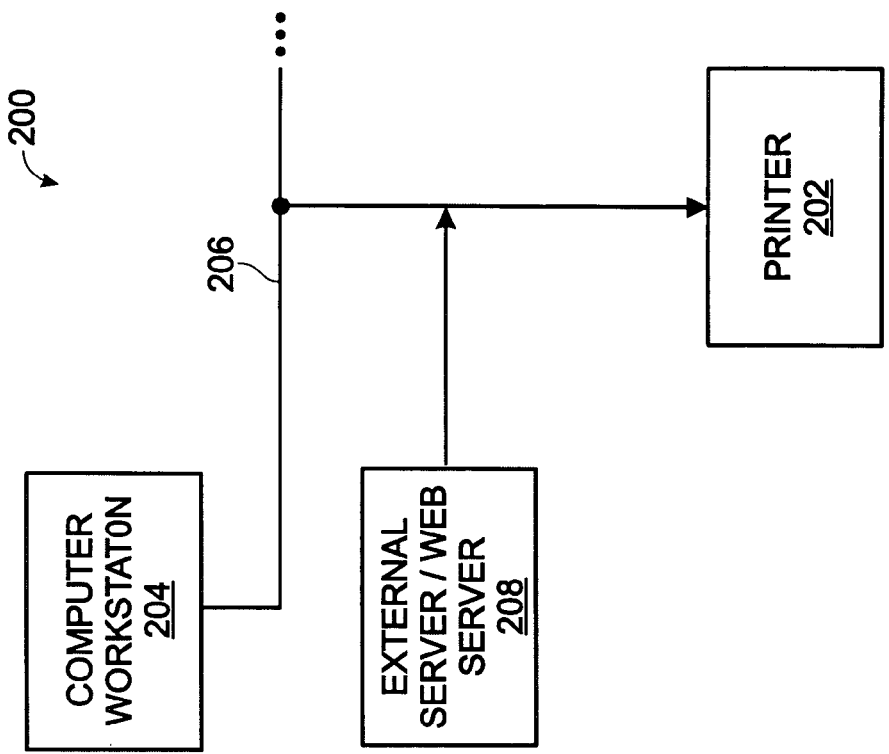
FIG. 2 is a schematic block diagram of the present invention system for installing printer driver software in the computer workstation of a network including a network-connected printer and computer workstation.
Figure 1:
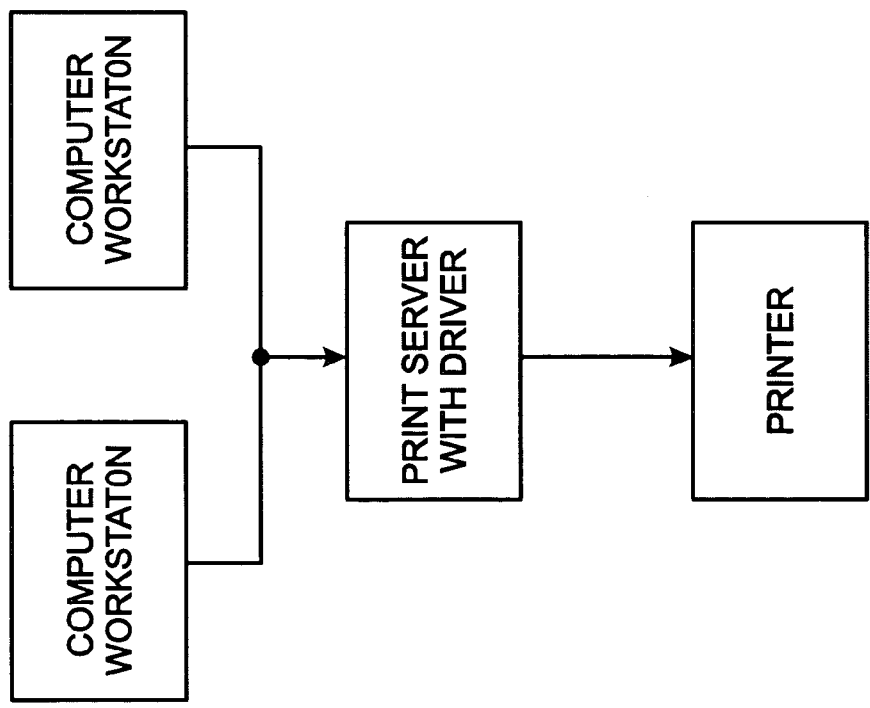
FIG. 1 is a schematic block diagram of a convention system for interfacing a computer workstation to a printer (prior art).

FIG. 2 is a schematic block diagram of the present invention system for installing printer driver software in the computer workstation of a network including a network-connected printer and computer workstation. The system 200 comprises a printer 202 and at least one computer workstation 204 connected to the printer 202 through a network 206. The network 206 can be a local intranet, the Internet, or both.

Figure 3:
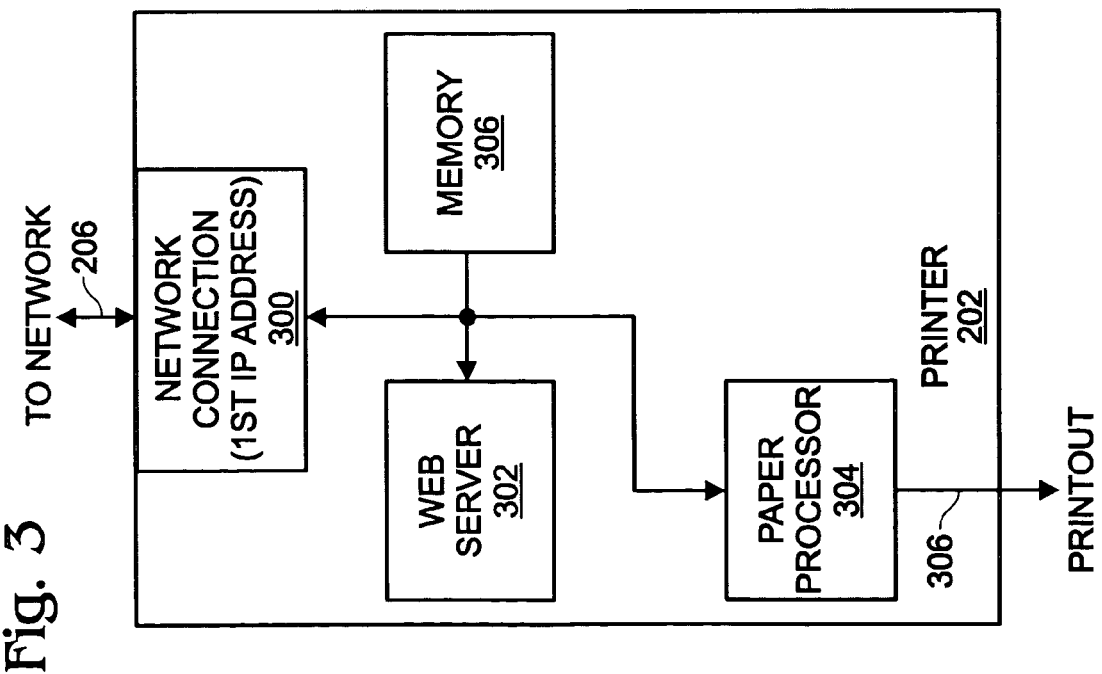
FIG. 3 is a schematic block diagram of the printer of FIG. 2 in greater detail.

FIG. 3 is a schematic block diagram of the printer 202 of FIG. 2 in greater detail. It should be understood that the word "printer" refers to a paper processing device that performs functions such as printing, copying, scanning, or faxing. Although the device can be a single-function device, it is typically a MFP. The printer 202 includes a network connection 300 with a first IP address. The printer 202 also includes an embedded web server 302 connected to the network connection 300 to receive requests for printer driver software addressed to the first IP address from network connected-computer workstations. These requests cause printer driver software to be supplied to computer workstations.

The printer 202 further comprises a paper processor 304 connected to the network connection 300 to receive documents from computer workstations in accordance with the supplied printer driver software. The processor 304 has an output 306 to supply processed documents (printouts).

Figure 4:
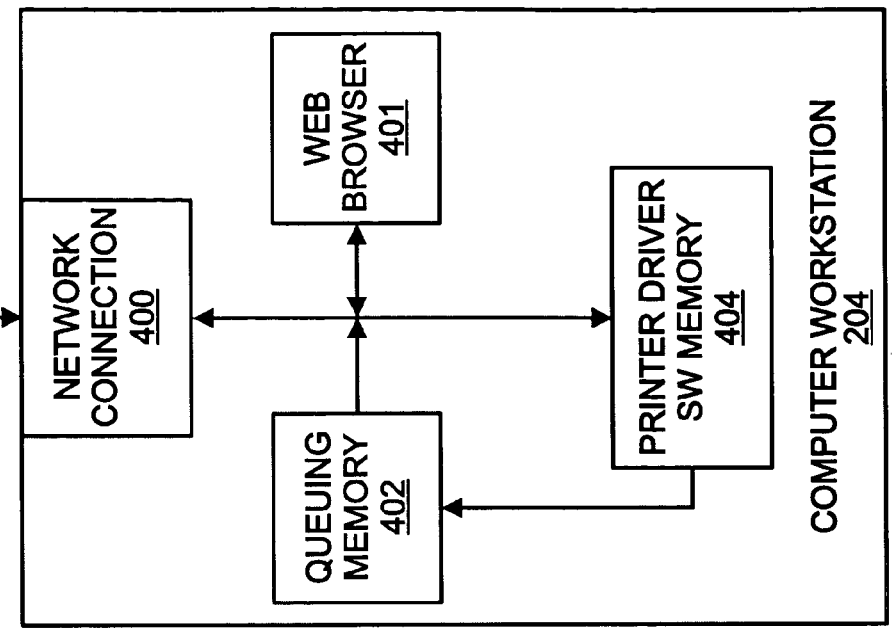
FIG. 4 is a schematic block diagram of the computer workstation of FIG. 2 in greater detail.

FIG. 4 is a schematic block diagram of the computer workstation 204 of FIG. 2 in greater detail. The computer workstation has a network connection 400 enabled with a web browser 401. The computer workstation also includes a memory 402 connected to the network connection 400 for queuing documents to be processed by the printer. Printer driver software is stored in memory 404, which is also connected to the network connection 400. The computer workstation can be any device capable of supporting network communications with the printer. Typically, the computer workstation is a desktop or laptop computer.

Viewing FIGS. 2 through 4, the computer workstation 204 must have the proper printer diver software to process documents at the printer 202. Once the printer driver software for the printer 202 has been obtained, the documents can be prepared and queued for service at the printer. The process of obtaining printer driver software in accordance with the present invention is begun when the computer workstation 204 enters the first IP address (of the printer 202) using a web browser 403. It is assumed that the first IP address is known to the computer workstation, or by the workstation user.

The printer web server 302 supplies a web page with a hypertext link in response to receiving a request from the computer workstation. The computer workstation 204 selects the hypertext link, and the printer web server 302 initiates the supply of the printer driver software to the computer workstation memory 404, in response to the hypertext link being selected.

As shown in FIG. 3, a printer memory 306 is connected to the network connection 300 and the web server 302. The printer memory 306 stores printer driver software. The web server 304 supplies the printer driver software from the printer memory 306 to the computer workstation printer driver software memory 404.

Again viewing FIGS. 2 through 4, the printer driver software in the printer memory 404 includes instructions for processes selected from the group including printing, copying, scanning, and faxing. The paper processor 304 processes are selected from the group including printing, copying, scanning, and faxing.

As shown in FIG. 2, in some aspects of the invention, an external server/web server 208 is connected to the printer network connection 300 to supply updated process driver software to the printer web server 302. The printer memory 306 receives and stores the updated printer driver software. Regardless of how the printer 202 receives the updated printer driver software, the web server 304 notifies the computer workstation 204 of the updated printer driver software. In response to receiving an update notification acknowledgement from the computer workstation, the first printer 202 supplies the updated printer driver software from the printer memory 306 to the requesting computer workstation 204 for storage in memory 404.

Alternately, the web server 302 automatically supplies the updated printer driver software from the printer memory 306 to the computer workstation 204 for storage in memory 404.

SYSTEM OPERATION

To set up the present invention system, a user needs to know the IP address of the printer or MFP to be used. The user utilizes a web browser installed in the computer workstation to access the embedded web server in the printer. A hyperlink on the MFP web page offers the ability to install the print, copy, scan, fax or other drivers needed to take full advantage of the services of the printer. When the users click on the hypertext link, the appropriate driver is loaded on their workstation. The print queue or other services are then available on the user workstation.

The installation of the printer driver software directly from the printer or MFP distinguishes the present invention from conventional disk, media, and other installation systems. Since the printer drivers are installed by clicking the hyperlink on the printer's embedded web page, there is no need to use physical media to set up the system or server. The software comes directly from the printer. The printer can update its printer driver software in memory to the latest version, when it becomes available on the external server/web server accessed, through an Internet connection.

The printer or MFP can notify users of updated printer driver software through messaging, email, or other means, or can automatically install the new drivers as the system is used. There is no need for the user to navigate operating system dependent control panels or installation functions to connect a new print queue or scan device.

The printer can provide reports on users configured for use, since it is aware of users that have used the web page to install drivers. The printer can automatically install updated drivers on the user machine during the print process, if desired, in two-way communications.

FIG. 5 is a flowchart illustrating a method for installing printer driver software in the computer workstation, of a network including a printer and a computer workstation. Although the method, and the method described by FIG. 6 below, is depicted as a sequence of numbered steps for clarity, no order should be inferred from the numbering unless explicitly stated. Again it should be understood that a printer can either be a single-function or an MFP device. The method begins at Step 500. Step 502 accesses a first network-connected printer from a first network-connected computer workstation. Step 504, in response to accessing the first printer, downloads printer driver software to the first computer workstation. Step 506 stores the printer driver software in the first computer workstation. Step 508, in response to invoking the printer driver software, transmits a document from the computer workstation to the first printer for processing. Transmitting a document from the computer workstation to the first printer for processing in Step 508 includes queuing documents to be printed at the first computer workstation.

The first printer has a first IP address. Then, accessing a first network-connected printer from a first network-connected computer workstation in Step 502 includes substeps. In Step 502a the first computer workstation loads a web browser. In Step 502b the first computer workstation enters the first IP address from the web browser. In Step 502c the first computer workstation accesses an embedded web server in the first printer.

In Step 503a, following the accessing of an embedded web server in the first computer workstation in Step 502, the first printer web server supplies a hypertext link. In Step 503b the first computer workstation selects the hypertext link to initiate the downloading of the printer driver software.

When the first printer is a multifunction printer (MFP), downloading printer driver software to the first computer workstation in Step 504 includes installing printer driver software for processes selected from the group including printing, copying, scanning, and faxing. Then, transmitting a document from the first computer workstation to the first printer for processing in Step 508 includes the document processing being selected from the group including printing, copying, scanning, and faxing.

Some aspects of the invention include further steps. In Step 510 the first computer workstation receives an updated printer driver. In some aspects of the invention, the first printer communicates with an external server/web server in Step 509a. Then, Step 510 includes the external/server web server supplying updated printer driver software to the first computer workstation. Alternately, in Step 509b the first printer receives updated printer driver software by whatever means, for example, from the external server/web server or from a disk. When the update is received from an external server/web server, Step 510 includes supplying updated printer driver software to the first computer workstation from the first printer.

In some aspects, the first printer notifies the first computer workstation of updated printer driver software in Step 509c (not shown). In Step 509d (not shown) the first printer acknowledges the update notification. Then, Step 510 includes downloading the updated printer driver software from the first printer in response to the acknowledgement. In yet another alternative, Step 510 includes the first printer automatically downloading the updated process driver software to the first computer workstation.

FIG. 6 is a flowchart illustrating a method for a network-connected printer to supply printer driver software to a network-connected computer workstation. The method starts at Step 600. In Step 602 the printer receives a request from a first network-connected computer workstation. Step 604, in response to receiving the request, causes printer driver software to be supplied to the first computer workstation. Step 606 receives documents from the first computer workstation in accordance with the supplied printer driver software. Step 608 processes the received documents.

The printer has a first IP address. Receiving a request from a first network-connected computer workstation in Step 602 includes receiving a request addressed to the first IP address. Then, a further step, Step 603a supplies a web page from an embedded web server. Step 603b receives web page communications. Typically, supplying a web page from an embedded web server in Step 603a includes supplying a hypertext link, and receiving the web page communications in Step 603b includes the hypertext link being selected. Step 603c initiates the supply of the printer driver software, in response to selecting the hypertext link. Then, causing printer driver software to be supplied to the first computer workstation in Step 604 includes directly supplying the printer driver software to the first computer workstation, in response to the hypertext link being selected.

When the printer is a multifunction printer, supplying printer driver software to the first computer workstation in Step 604 includes supplying printer driver software for processes selected from the group including printing, copying, scanning, and faxing. Then, processing the received documents in Step 608 includes document processing selected from the group including printing, copying, scanning, and faxing.

Step 610 supplies updated printer driver software. In some aspects, Step 609a communicates with an external server/web server. Step 609b receives updated printer driver software from the external server/web server. Supplying updated printer driver software in Step 610 includes supplying updated printer driver software received from the external server/web server.

In some aspects, Step 609c notifies the first computer workstation of the updated printer driver software. Step 609d receives an update notification acknowledgement from the first computer workstation. Then, supplying the updated printer driver software in Step 610 includes supplying the updated printer driver software to the first computer workstation in response to the acknowledgement in Step 609d. Alternately, Step 610 automatically supplies the updated process driver software to the first computer workstation.

FIG. 7 is a flowchart illustrating a method for supplying printer driver software from a printer. The method starts at Step 700. Step 702 receives a request from a computer workstation addressed to a printer with a first IP address. Step 704 supplies printer driver software to the requesting computer workstation.

A system and method have been provided for directly loading printer driver software from a network-connected printer to a network connected computer workstation. Examples have been provided of specific implementations of how communications with the printer are conducted. However, the present invention is not limited to merely these examples. Various examples have also been given for updating printer driver software. However, other variations and embodiments of the invention will occur to those skilled in the art.

We claim:

1. In a network including a multifunctional peripheral (MFP) having an IP address and a computer workstation, a method for installing process driver software in the computer workstation, the method comprising:
   receiving updated process driver software at a network-connected MFP;
   a network-connected computer workstation loading a web browser;
   the computer workstation entering the IP address from the web browser;
   the computer workstation accessing a web server embedded in the MFP;
   the web server supplying hypertext links to processes selected from the group including printing, copying, scanning, and faxing;
   the computer workstation selecting a hypertext link to initiate the downloading of process driver software;
   storing the process driver software in the computer workstation; and,
   in response to invoking the process driver software, transmitting a document from the computer workstation to the MFP for processing.

2. The method of claim 1 wherein transmitting a document from the computer workstation to the MFP for processing includes queuing documents to be printed at the first computer workstation.

3. The method of claim 1 further comprising:
   the printer automatically downloading updated process driver software to the computer workstation in response to the computer workstation entering the IP address.

4. A method for a network-connected multifunctional peripheral (MFP) to supply process driver software to a network-connected computer workstation, the method comprising:
   receiving a request from a network-connected computer workstation, addressed to a to MFP with an IP address;
   supplying a web page from a web server embedded in the MFP with hypertext links cross-referenced to process driver software selected from the group including printing, copying, scanning, and faxing;
   supplying updated process driver software to the computer workstation in response to receiving a selected hypertext link;
   receiving documents from the computer workstation in accordance with the supplied process driver software; and,
   processing the received documents.

5. The method of claim 4 further comprising:
   automatically supplying updated process driver software to the computer workstation in response to accessing the IP address.

6. In a network-connected multifunctional peripheral (MFP), a system for installing process driver software in a network-connected computer workstation, the MFP comprising:
   a network connection with an IP address;
   an embedded web server connected to the network connection to receive updated process driver software, to supply updated process driver software notifications with hypertext links cross-referenced to process drivers selected from the group including printing, copying, scanning, and faxing, to receive hypertext link selections, and to cause updated process driver software to be supplied to requesting computer workstations;
   a MFP memory, connected to the network connection and to the embedded web server, for receiving and storing updated process driver software; and,
   a paper processor connected to the network connection to receive documents from computer workstations in accordance with the supplied process driver software, the paper processor having an output to supply processed documents.

7. The system of claim 6 wherein the web server automatically supplies the updated process driver software to network-connected computer workstations.

8. In a network including a network-connected multifunctional peripheral (MFP) and computer workstation, a system for installing process driver software in the computer workstation, the system comprising:
   a MFP including:
      a network connection with an IP address;
      an embedded web server connected to the network connection to receive updated process driver software selected from the group including printing, copying, scanning, and faxing, to send hypertext links cross-referenced to process drivers, and in response to receiving a hypertext link selection, to supply updated process driver software;
      a MFP memory connected to the network connection and the web server for storing the updated process driver software; and,
      a paper processor connected to the network connection to receive documents from computer workstations in accordance with the supplied process driver software, the processor having an output to supply processed documents; and,
   a computer workstation including:
      a network connection enabled with a web browser;
      a memory connected to the network connection for storing process driver software; and,
      a memory connected to the network connection for queuing documents to be processed by the MFP.

9. The system of claim 8 further comprising:
   an external server/web server connected to the MFP network connection to supply updated process driver software to the MFP web server; and,
   wherein the MFP memory stores the updated process driver software.

10. The system of claim 8 wherein the web server automatically supplies updated process driver software from the MFP memory to the computer workstation.

* * * * *